US005441785A

United States Patent [19]

[11] Patent Number: 5,441,785

[45] Date of Patent: Aug. 15, 1995

Liebe, Jr.

[54] COMPOSITE ALIGNMENT-MAINTAINING PLASTIC LETTERING MATERIAL

[76] Inventor: Robert J. Liebe, Jr., 1577 Kehrs Mill Rd., Chesterfield, Mo. 63005

[21] Appl. No.: 134,184

[22] Filed: Oct. 8, 1993

Related U.S. Application Data

[63] Continuation-in-part of Ser. No. 856,128, Mar. 3, 1992, abandoned, which is a continuation-in-part of Ser. No. 636,877, Jan. 2, 1991, Pat. No. 5,112,423.

[51] Int. Cl.[6] .......... B32B 9/00

[52] U.S. Cl. .......... 428/41; 428/40; 428/195; 428/200; 428/207; 428/212; 428/216; 428/343; 428/346; 428/347; 428/348; 428/352; 156/230; 156/236; 156/238; 156/239

[58] Field of Search .......... 428/40, 41, 43, 195, 428/215, 335, 346, 349, 353, 212, 913, 914, 216, 343, 207, 347, 352, 200; 156/230, 236, 238, 239

[56] References Cited

U.S. PATENT DOCUMENTS

| | | | |
|---|---|---|---|
| 2,647,849 | 4/1953 | Douglas et al. | 428/40 |
| 3,453,761 | 7/1969 | Giesecke | 428/118 |
| 3,660,212 | 5/1972 | Liebe, jr. | 161/41 |
| 3,676,248 | 7/1972 | Swartz | 156/235 |
| 3,847,725 | 11/1974 | Hochner | 161/167 |
| 3,987,225 | 10/1976 | Reed et al. | 428/43 |
| 4,020,204 | 4/1977 | Taylor et al. | 428/40 |
| 4,041,200 | 8/1977 | Boranian et al. | 428/40 |
| 4,318,953 | 3/1982 | Smith et al. | 428/200 |
| 4,378,398 | 3/1983 | Klemme | 428/215 |
| 4,717,621 | 1/1988 | So et al. | 428/352 |
| 4,786,349 | 11/1988 | Mahn, Sr. | 156/234 |
| 4,875,961 | 10/1989 | Oike et al. | 156/234 |
| 5,026,584 | 6/1991 | Logan | 428/41 |
| 5,112,423 | 5/1992 | Liebe, Jr. | 428/41 |

FOREIGN PATENT DOCUMENTS 1076015 4/1980 Canada .

*Primary Examiner*—Patrick J. Ryan
*Assistant Examiner*—Abraham Bahta
*Attorney, Agent, or Firm*—Jerome A. Gross

[57] ABSTRACT

A layered composite sheet material for temporarily retaining a plurality of lettering elements to be cut therefrom in alignment for subsequent application to a substrate. The composite sheet material includes a release sheet of material not having a melting point of less than 490° F., a display layer which substantially covers one surface of the release sheet and has a melting point higher than substantially 320° F., but lower than that of the release sheet, and a layer of thermally activated adhesive, having a melting point substantially lower then the display layer, covering the surface of the display layer opposite the release sheet.

15 Claims, 2 Drawing Sheets

COMPOSITE ALIGNMENT-MAINTAINING PLASTIC LETTERING MATERIAL

REFERENCE TO RELATED APPLICATIONS

This application is a continuation-in-part of application Ser. No. 07/856,128, filed Mar. 3, 1992, entitled "Alignment-Maintaining Plastic Lettering Material", now abandoned, which was a continuation-in-part of application Ser. No. 07/636,877, filed Jan. 2, 1991, entitled "Method of Making and Applying Alignment-Maintaining Plastic Lettering Material", issued May 12, 1992 as U.S. Pat. No. 5,112,423.

BACKGROUND OF THE INVENTION

1. Field of the Invention

This invention relates to lettering elements, including figures and designs, cut from pigmented flexible plastic sheet material; and to the process of applying them in an aligned group, as on fabrics, commercial awnings and other surfaces.

2. Description of Related Art

U.S. Pat. No. 3,660,212 to Liebe discloses a process for making plastic lettering material comprising a paper release sheet, a vinyl display layer, and an encapsulating thermoplastic adhesive sheet bonded to the surface of the display layer opposite the release sheet. For application of a design or lettering onto a woven or knitted garment or other permanent substrate, separate lettering elements are die-stamped from such sheet material and individually positioned and heat bonded (in effect ironed) onto the surface of the substrate, the heat liquified adhesive creating a mechanical bond by flowing into and curing within the interstitial spaces of the porous surface of the substrate. Such lettering material is serviceable but requires careful and time-consuming alignment of the separate lettering elements upon application to the chosen substrate.

Other transfer sheet materials of the prior art provide a release sheet which remains whole and uncut throughout the application process, but require that designs or lettering elements be either cut separately and applied to the release sheet, or printed on the release sheet prior to application to the substrate. Thus, for each desired design, an unique transfer sheet must be put together; design elements must be applied to the release sheet in the desired alignment and adhesive must then be applied over the design material. Such requirements make it impossible to use a transfer sheet material which has release sheet, display layer and adhesive layer already fabricated together into a unitary composite sheet.

Yet other transfer sheet materials which are suitable for use in thermal printers incorporate release sheets bonded to continuous ink and adhesive layers forming a unitary composite sheet, but to permit the rapid heat transfer required for successful use with a thermal printer, the composite sheets must be so thin that transfer of lettering elements of the size and durability necessary for clothing, signs and larger displays is not practical.

For the foregoing reasons, there is a need for a transfer sheet material which can be supplied as a unitary composite sheet in pre-laminated form and from which a plurality of large and durable lettering elements may be cut and subsequently transferred to a chosen substrate in the same alignment as they were cut into the transfer sheet material.

SUMMARY OF THE INVENTION

The above objectives are accomplished by a layered composite sheet material for temporarily retaining a plurality of lettering elements to be cut therefrom in alignment for subsequent application to a substrate. The layered composite sheet material includes a release sheet, a pigmented display layer fused directly onto one side of the release sheet and covering an area at least larger than the lettering elements to be cut therefrom. The adherence of the display layer to the release sheet is weaker than the adherence of the display layer to a substrate through the action of an adhesive layer which covers the surface of the display layer opposite the release sheet. Thus, on cutting outlines of the lettering elements through the adhesive and display layers only and stripping away from the release sheet the portions of those layers not within the outlines, the plurality of lettering elements which remain on the release sheet retain their relative position for adherence thereafter by their adhesive layer portions to a chosen substrate.

The pigmented display layer of the present invention may contain two vinyl chloride polymers (PVC), one of which has been partially carboxylated. It has been found that including partially carboxylated polyvinyl chloride forms a display layer which adheres with greatly increased tenacity to the release sheet onto which it is cast and cured without the use of an adhesive, yet allows the release sheet to be stripped away from the mounted lettering elements as hereinafter described.

The strength of the adhesion between the display layer and release sheet varies with the composition of the PVC/partially carboxylated PVC blend. The higher the percentage of partially carboxylated PVC, the greater the adherence to the release sheet. Display layers in which the PVC polymer constituent is all partially carboxylated have exhibited the strongest adherence.

The increased adhesion of the display layer to the release sheet without use of an adhesive allows lettering elements to be maintained during application as they were plotted and cut, and the lack of adhesive results in a cleaner end product.

DESCRIPTION OF THE PREFERRED EMBODIMENT

Figure 1:
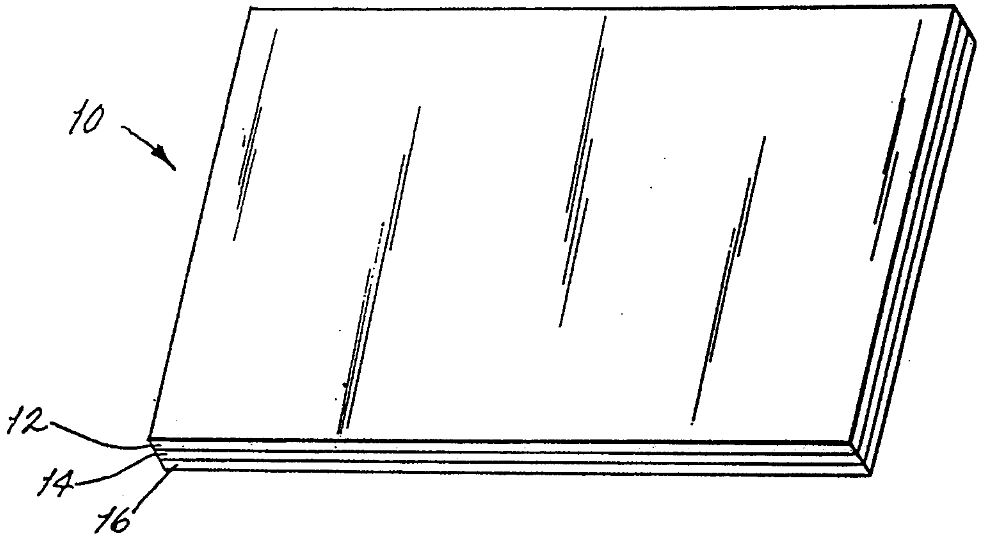
FIG. 1 illustrates, in exaggerated thickness, a portion of the layered composite sheet material of the present invention showing, from front-to-back, adhesive, display and release sheet layers.

The layered composite sheet material of the present invention shown in FIG. 1 and generally designated 10, includes (1) a translucent release sheet 16 of heat stabilized, or oriented polyester upon one surface of which is cast (2) a pigmented display layer 14 which includes a mixture of polyvinyl chloride (PVC), partially carboxylated PVC, vinyl acetate copolymers, pigments and stabilizers, and (3) an adhesive layer 12 which is applied to the surface of the display layer 14 opposite the release sheet 16. The composite sheet material 10 of the present invention may be laid up by the use of the equipment and process described in U.S. Pat. No. 3,660,212 to Liebe.

The display layer 14 of the present invention may be formed from: a physical mixture, in a plasticizer dispersion, of two PVC polymers in powder form, one of which has been partially carboxylated; pigment, including varying amounts of colorant; and epoxy and tin maleate stabilizers. The partially carboxylated PVC may contain a carboxylic acid functionality of from 0.5 to 3.0%, 1.67% being preferred and commercially available. The non-carboxylated PVC may contain 95.5% PVC and 4.5% vinyl acetate copolymers. The preferred formula for the display layer is as follows:

| | % by weight |
|---|---|
| Partially carboxylated polyvinyl chloride and vinyl acetate copolymers | 15–45 |
| Copolymer PVC | 30–0 |
| Phthalate ester plasticizer | 35 |
| Titanium dioxide pigment and colorant | 18 |
| Epoxy stabilizer | 0.5 |
| Tin maleate stabilizer | 1.5 |
| | 100 |

The melting temperature of the display layer 14 may be substantially 320° F. to 400° F. but in any event, is substantially 320° F. or higher, but is lower than the melting point of the release sheet 16. Typically, the melting point of the release sheet 16 is above 490° F. The melting point of the heat-stabilized polyester is about 509° F and that of the oriented polyester is about 493° F.

The thickness of the display layer should be sufficient to provide lettering elements of the thickness and toughness desired for the particular application they will serve. The display layer is at least 2 mil, and is preferably substantially 2 to 3 mil thick, but may be thicker if necessary.

The display layer 14 may be stabilized against ultraviolet radiation by use of a combination of conventional organometallic stabilizers, conventional ultraviolet screening agents, or combinations of these, epoxy stabilizers and high pigment loading, so that ultraviolet light is adequately screened from degrading the polymer comprising the display layer 14.

The release sheet 16, remains substantially intact when outlines 18 of individual lettering elements 20 are cut, and serves as a carrier for such lettering elements 20 as described in related application Ser. No. 07/636,877, now issued as U.S. Pat. No. 5,112,423. The release sheet 16 is preferably a film of either translucent heat-stabilized polyester, available under the trade name Melinex ST 507 from ICI Americas, Inc., of Wilmington, Del.; or of "Hostaphan" oriented polyester, type 3000 or 4500, available from Hoechst-Diafoil. The release sheet 16 should not have a melting point of lower than about 490° F., to withstand the temperature required for curing the display layer 14 on it. To provide sufficient thickness and strength for ease in handling and for cutting, the display sheet 16 may have a tensile strength above about 24,000 psi and be from 300 to 500 gauge thickness. The greater thickness allows for variation in the ability of individual plotter/cutters to cut to a precise depth, thus avoiding accidental severing of the release sheet 16.

The adhesive layer 12 may be composed of any adhesive which has sufficient tack and holding power for the intended application. Further, components of the adhesive layer 12 must be compatible with the components of the display layer 14. The preferred adhesive is a thermoplastic (also called a thermally-activated) adhesive, preferably polyester, capable of substantially permanent adhesion to a substantially smooth substrate (designated a, in FIG. 4).

The melting (or activation) temperature of such adhesive layer 12 may be substantially less than 320° F. and in any case, must be lower than the melting point of the display layer 14. Bostik 4103 Hot Melt Adhesive, Bostik 4117 Polyester Extrusion Polymer, and B. F. Goodrich Estane 58409 are commercially available adhesives which meet these requirements. The adhesive layer 12 is formed and applied as described in U.S. Pat. No. 3,660,212.

Alternatively, a pressure-sensitive adhesive may be used. Typical pressure-sensitive adhesives include acrylic, vinyl acetate, ethylene vinyl acetate, carboxylated styrene butadiene rubber, styrene isoprene styrene elastomer and styrene butadiene styrene elastomer. These adhesives are available preformed on release sheets, in solvent solutions or as emulsions. Acrylic adhesives are preferred for their strength of adhesion and compatibility with the vinyl display layer 14. National Starch Duro-Tak 1070, and Monsanto's Gelva 1753 and 1159 are suitable commercially available pressure sensitive adhesives.

Traditional solvent-activated adhesives may also be used for the adhesive layer 12. These adhesives include those made from acrylics, acrylic copolymers, vinyl chloride co-polymers, urethanes, and vinyl acetate copolymers. These adhesives are activated when contacted with a suitable activating solvent.

To form the layered composite sheet material 10 of the present invention, the PVC mixture used to form the display layer 14 is knife spread onto one side of the release sheet 16 and cured at a temperature which may be substantially 320° F. to 400° F., as described in U.S. Pat. No. 3,660,212. Alternatively, the material for the display layer 14 may be applied to the release sheet by any suitable coating method including lamination, reverse roll, gravure, spray and screen printing methods. The display layer 14 is applied so as to substantially cover one side of the release sheet 16 in a continuous layer. Alternatively, the display layer 14 may be applied to at least an area of the surface of the release sheet 16 larger than will be included in the outlines 18 of the lettering elements 20 to be cut therein.

Such curing of the display layer 14 causes the discrete particles of PVC and partially carboxylated PVC to go irreversibly into solution forming a display layer 14. The presence of such partially carboxylated PVC in the display layer 14 affords enhanced adherence to the release sheet 16, which is particularly useful if the release sheet 16 has been coated with a silicon release agent, or is made of paper, as hereinafter referred to. The fact that the melting point of the release sheet 16 is higher than that of the display layer 14 allows such curing of the display layer 14 without softening or distortion of the release sheet 16.

An adhesive layer 12 comprising one of the following adhesives is then applied to the display layer 14.

Thermoplastic polyester adhesive is preferably adhered as a preformed sheet to the heated surface of the newly cured display layer 14 while its temperature is higher than the melting point of said adhesive layer 12, in the manner described in U.S. Pat. No. 3,660,212 to Liebe, and the material so formed is allowed to cool to room temperature.

Pressure sensitive and solvent activated adhesives may be applied to the display layer 14 by any suitable coating method, including lamination, reverse roll, knife, gravure, spray and screen printing methods.

If a pressure sensitive adhesive is used, a protective coating or sheet is required. Traditionally, a standard protective sheet, such as a silicon-coated protective sheet, capable of peeling cleanly from the adhesive layer 12 has been applied to the surface of the adhesive layer 12 opposite the release sheet 16. Alternatively, a layer of water soluble polymer can be added onto the adhesive to serve as the protective coating; when the lettering elements 20 are to be affixed to a substrate, the protective coating is washed off with water. The addition of a colorant to the water soluble polymer is helpful to insure that the protective layer is completely removed.

After cutting the outlines 18 of the lettering elements 20, the protective covering is removed and the lettering elements 20 aligned and fixed to a substrate by pressure.

Solvent activated adhesives are prepared for affixation to a substrate by spraying with a suitable solvent. The solvent dissolves a portion of the adhesive to give a "tacky" or "adhesive" characteristic to the adhesive layer for a period sufficient to position the lettering elements 20 onto the substrate. The length of time that the adhesive layer 14 remains softened is a function of the solvent choice and ambient conditions and may be customized for each particular use by those skilled in the art. Lettering elements 20 from composite sheet material 10 with this type of adhesive layer 12 is applied with pressure.

Figure 2:
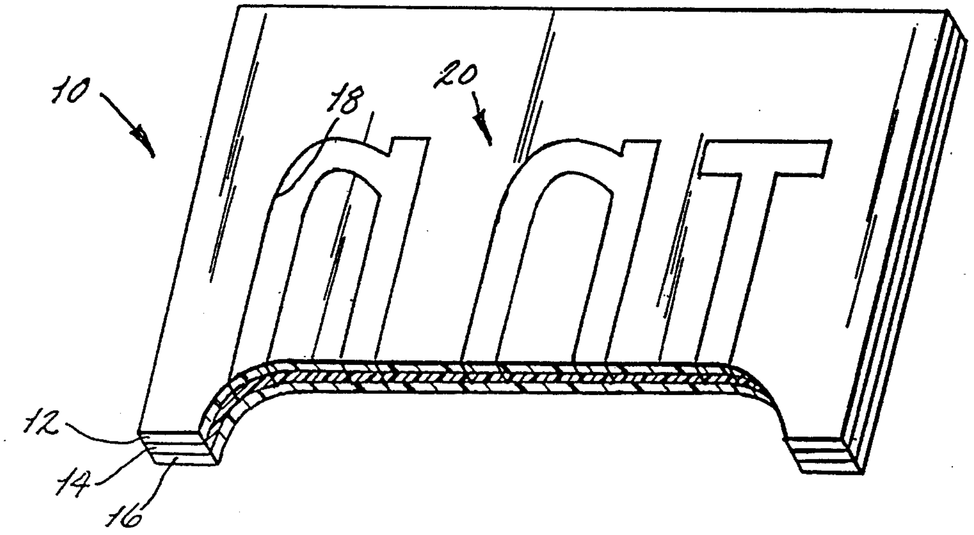
FIG. 2 shows, in broken cross-section, the layered composite sheet material with outlines of lettering elements cut through the adhesive and display layers but not through the release sheet.
Figure 3:
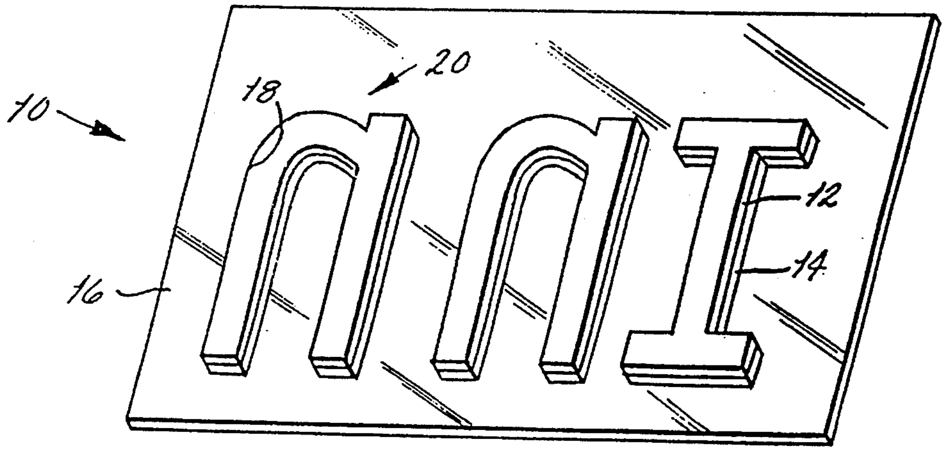
FIG. 3 is a schematic view of the layered composite sheet material with those portions of the adhesive and display layers not within the cut outlines of the lettering elements having been removed, thus leaving the lettering elements on the release sheet in the same alignment as they were cut.
Figure 4:
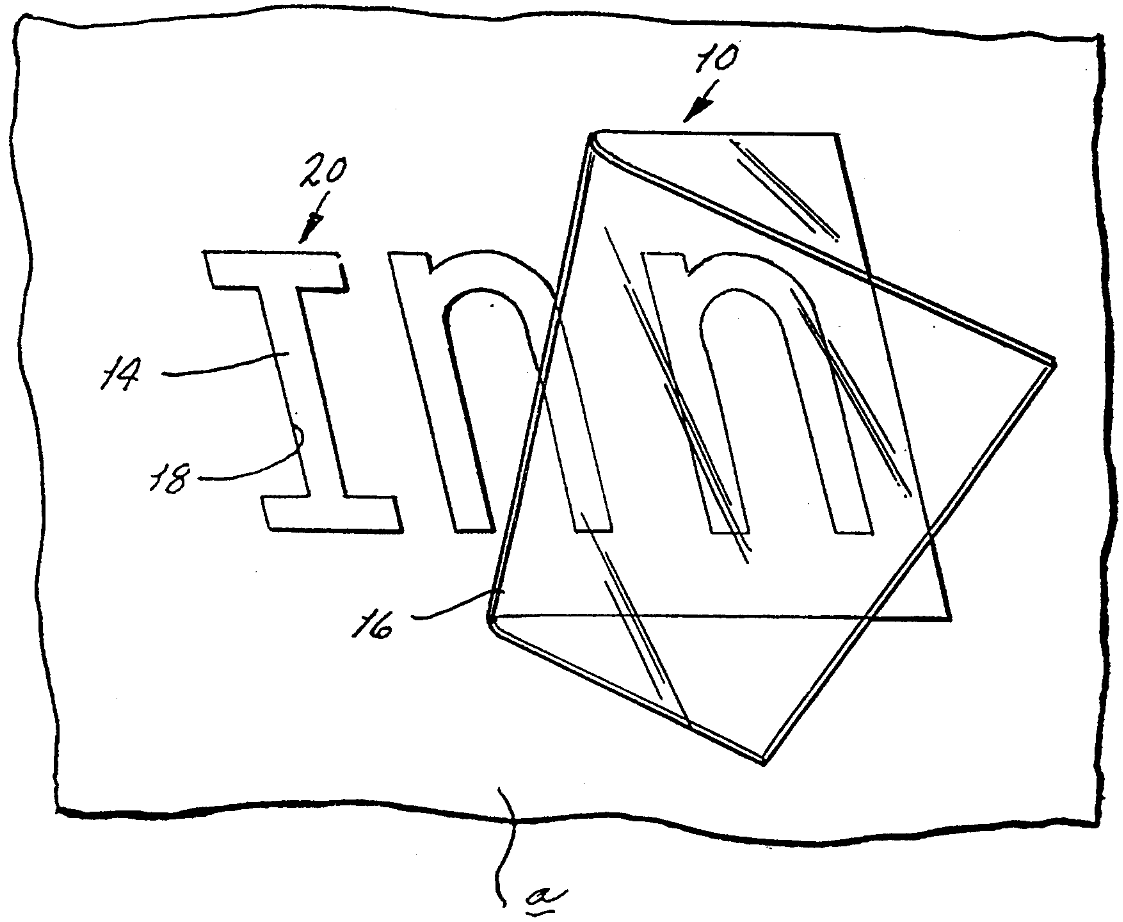
FIG. 4 illustrates the lettering elements retaining their alignment upon being transferred from the release sheet to a substrate.

The composite sheet material 10 of the present invention may be used to transfer lettering elements 20 to a chosen substrate (a in FIG. 4) as described in related application, Ser. No. 07/636,877, now U.S. Pat. No. 5,112,423. Briefly stated, the outlines 18 of the lettering elements 20 are cut (as shown in FIG. 2), starting from the outer surface of the adhesive layer 12, through the adhesive layer 12 and the display layer 14, but not through the release sheet 16. Next, as shown in FIG. 3, those portions of the adhesive layer 12 and display layer 14 not included within the outlines 18 of the lettering elements 20 are stripped from, or removed from, the release sheet 16, leaving the plurality of lettering elements 20 cut therein to remain on the release sheet 16 in the same alignment in which they were cut. Each lettering element, as shown in FIG. 3, then comprises a portion of the display layer 14 and a portion of the adhesive layer 12. The adhesive layer 14 is then activated as described above, and the lettering elements 20 positioned on a substrate as illustrated in FIG. 4. Finally, the release sheet 16 is removed, leaving the lettering elements 20 fixed on the substrate by their adhesive layer portions in the same alignment as they were cut into the composite sheet material 10.

ALTERNATIVE EMBODIMENTS

While the embodiment described above is preferred for the advantage of translucency of the release sheet 16 along with a relatively high degree of adhesion of the PVC display layer to it, modifications within the scope of the invention will be apparent. Some such modifications are as follows.

In some applications, a lesser adhesion of display layer to release sheet may be preferred or considered satisfactory, depending upon such factors as the size of the sign content to be applied as a unit, the dimensions (e.g. slenderness) of the individual lettering elements 20, the chosen thickness of the display layer 14, and the amount of handling to which the composite sheet material 10 may be subjected following the cutting of the sign content. Adhesion may be reduced in several ways (hereinafter described in approximate descending order of adhesion). All of the PVC used in the display layer 14 may be non-carboxylated, or if partially carboxylated PVC is used, a heat-stabilized, or oriented polyester release sheet 16 may be coated with a conventional release agent such as silicon.

In applications where a greater adhesion between the display layer 14 and the release sheet 16 is desired, the ratio of partially carboxylated PVC to non-carboxylated PVC can be increased. It has been found that a display layer 14 consisting only of partially carboxylated PVC provides strongest adhesion.

Where the advantage of release sheet translucency may be dispensed with, a paper release sheet may be used with a display layer 14 containing partially carboxylated PVC. A medium grade of release paper is appropriate for use with such display layer 14.

To provide sufficient thickness for handling, release paper having a basis weight of as much as 110 may be preferred. This is to allow for variation in the ability of individual plotter/cutters to cut to a precise depth, thus to provide sufficient thickness for prevention of accidental severing of the release sheet.

Further, while the thermoplastic adhesive has been herein described as being a polyester layer adhered in sheet form onto the display layer 14, the adhesive layer 12 may alternatively be applied in any form found suitable.

Throughout this application the term "translucent" is to be taken to include "transparent". The term "fused onto" is to be taken to include the terms "cast onto" or "applied to".

As various modifications may be made in the constructions herein described and illustrated without departing from the scope of the invention, it is intended that all matter contained in the foregoing description or shown in the accompanying drawings shall be interpreted as illustrative rather than limiting.

I claim:

1. A layered composite sheet material for temporarily retaining a plurality of lettering elements to be cut therefrom in alignment for subsequent application to a substrate, comprising a release sheet, a pigmented display layer of at least 2 mil thickness fused directly onto one side of said release sheet and covering an area at least larger than such lettering elements to be cut therefrom, the adherence of said display layer to said release sheet being weaker than its adherence to such substrate through the action of an adhesive layer which covers the surface of said display layer opposite said release sheet, whereby on cutting outlines of such lettering elements through said adhesive and display layers only and stripping away from said release sheet the portions of said layers not within the outlines, such plurality of lettering elements which remain on said release sheet retain their relative position for adherence thereafter by their adhesive layer portions to a chosen substrate.

2. A layered composite sheet material as described in Claim 1 wherein said release sheet is paper.

3. A layered composite sheet material as described in Claim 1 wherein said display layer substantially covers one side of said release sheet in a continuous layer.

4. A layered composite sheet material as described in Claim 1 wherein said display layer comprises a mixture of polyvinyl chloride with partially carboxylated polyvinyl chloride.

5. A layered composite sheet material as described in Claim 1 wherein said display layer comprises only partially carboxylated polyvinyl chloride.

6. A layered composite sheet material for temporarily retaining a plurality of lettering elements to be cut therefrom in alignment for subsequent application to a substrate, comprising a release sheet of a material not having a melting point of less than 490° F., a pigmented display layer of at least 2 mil thickness fused directly onto one side of said release sheet and covering an area at least larger than such lettering elements to be cut therefrom, said display layer having a melting point of substantially 320° F. or higher, but lower than that of said release sheet, the adherence of said display layer to said release sheet being weaker than its adherence to such substrate through the action of a thermally activated adhesive layer which covers the surface of said display layer opposite said release sheet, the temperature at which said thermally activated adhesive layer is activated being lower than the melting point of said display layer, whereby on cutting outlines of such lettering elements through said adhesive and display layers only and stripping away from said release sheet the portions of said layers not within the outlines, such plurality of lettering elements which remain on said release sheet retain their relative position for adherence thereafter by their adhesive layer portions to a chosen substrate.

7. A layered composite sheet material as described in Claim 6 wherein said release sheet is heat-stabilized translucent polyester.

8. A layered composite sheet material as described in Claim 6 wherein said release sheet is oriented polyester.

9. A layered composite sheet material for temporarily retaining a plurality of lettering elements to be cut therefrom in alignment for subsequent application to a substrate, comprising a release sheet, a pigmented display layer of at least 2 mil thickness fused directly onto one side of said release sheet and covering an area at least larger than such lettering elements to be cut therefrom, the adherence of said display layer to said release sheet being weaker than its adherence to such substrate through the action of a pressure-sensitive adhesive layer which covers the surface of said display layer opposite said release sheet, whereby on cutting outlines of such lettering elements through said adhesive and display layers only and stripping away from said release sheet the portions of said layers not within the outlines, such plurality of lettering elements which remain On said release sheet retain their relative position for adherence thereafter by their adhesive layer portions to a chosen substrate.

10. A layered composite sheet material as described in claim 9 wherein said pressure-sensitive adhesive is selected from a group consisting of acrylic, vinyl acetate, ethylene vinyl acetate, carboxylated styrene butadiene rubber, styrene isoprene styrene elastomer, and styrene butadiene styrene elastomer.

11. A layered composite sheet material as described in Claim 9 further comprising a protective coating covering the surface of said pressure-sensitive layer opposite said release sheet.

12. A layered composite sheet material as described in Claim 11 wherein said protective coating comprises a water-soluble polymer.

13. A layered composite sheet material as described in Claim 11 wherein said protective coating comprises a silicon-coated protective sheet.

14. A layered composite sheet material for temporarily retaining a plurality of lettering elements to be cut therefrom in alignment for subsequent application to a substrate, comprising a release sheet, a pigmented display layer of at least 2 mil thickness fused directly onto one side of said release sheet and covering an area at least larger than such lettering elements to be cut therefrom, the adherence of said display layer to said release sheet being weaker than its adherence to such substrate through the action of a solvent-activated adhesive layer which covers the surface of said display layer opposite said release sheet, whereby on cutting outlines of such lettering elements through said adhesive and display layers only and stripping away from said release sheet the portions of said layers not within the outlines, such plurality of lettering elements which remain on said release sheet retain their relative position for adherence thereafter by their adhesive layer portions to a chosen substrate.

15. A layered composite sheet material as described in Claim 14 wherein said solvent-activated adhesive is selected from the group consisting of acrylic, acrylic co-polymers, vinyl chloride copolymers, urethanes, and vinyl acetate co-polymers.

* * * * *